(12) United States Patent
Tores

(10) Patent No.: US 6,296,198 B1
(45) Date of Patent: Oct. 2, 2001

(54) SYSTEM FOR CLEANING A SURFACE, SUCH AS AT LEAST ONE MOTOR VEHICLE HEADLIGHT

(75) Inventor: Denis Tores, Vaux le Penil (FR)

(73) Assignee: Societe d'Etudes et de Realisations Industrielles et Commerciales "SERIC", Chatelet en Brie (FR)

(*) Notice: Subject to any disclaimer, the term of this patent is extended or adjusted under 35 U.S.C. 154(b) by 0 days.

(21) Appl. No.: 09/242,195
(22) PCT Filed: Jun. 10, 1998
(86) PCT No.: PCT/FR98/01188
§ 371 Date: Feb. 10, 1999
§ 102(e) Date: Feb. 10, 1999
(87) PCT Pub. No.: WO98/56628
PCT Pub. Date: Dec. 17, 1998

(30) Foreign Application Priority Data

Jun. 11, 1997 (FR) .................................................. 97 07244

(51) Int. Cl.$^7$ ................................. B05B 1/10; B60S 1/46
(52) U.S. Cl. .................................... 239/284.1; 239/284.2; 239/587.3
(58) Field of Search .................................. 239/123, 125, 239/124, 284.1, 284.2, 587.3, 600, 601, 265.19; 137/539; 138/154; 15/250.002, 250.003

(56) References Cited

U.S. PATENT DOCUMENTS

| | | | |
|---|---|---|---|
| 2,634,166 | * 4/1953 | Sacchini | 239/284.1 |
| 2,929,401 | * 3/1960 | Cowan | 137/539 |
| 3,067,955 | * 12/1962 | Heath | 239/284.1 |
| 3,117,727 | * 1/1964 | Pollock et al. | 239/284.2 |
| 3,192,090 | * 6/1965 | Sarafinas et al. | 239/284.1 |
| 3,433,416 | * 3/1969 | Bauer et al. | 239/284.1 |
| 3,656,691 | * 4/1972 | Norstrand | 239/284.2 |
| 3,658,074 | * 4/1972 | Wright | 239/284.2 |
| 3,659,307 | * 5/1972 | Vitou | 15/250.1 |
| 3,866,840 | * 2/1975 | Harkrider | 239/284.2 |
| 3,979,068 | * 9/1976 | Applebaum | 239/284.1 |
| 4,029,259 | * 6/1977 | Ursel et al. | 239/284.2 |
| 4,177,928 | * 12/1979 | Bergkvist | 239/129 |
| 4,223,841 | * 9/1980 | Schaller et al. | 239/284.2 |
| 4,230,276 | * 10/1980 | Tinder et al. | 239/284.2 |
| 4,285,470 | * 8/1981 | Roth | 239/284.2 |

(List continued on next page.)

FOREIGN PATENT DOCUMENTS

| | | | |
|---|---|---|---|
| 1913810 | 10/1970 | (DE) . | |
| 1655857 | 5/1971 | (DE) . | |
| 2834010 | * 2/1980 | (DE) | 239/284.2 |
| 2945104 | * 5/1981 | (DE) | 239/284.2 |
| 3728508 | * 3/1988 | (DE) | 239/284.2 |
| 4324259 | 1/1995 | (DE) | B60S/1/52 |
| 4422590 | 1/1996 | (DE) | B60S/1/48 |
| 0306378 | 3/1989 | (EP) | B60S/1/52 |
| 2016267 | * 9/1979 | (GB) | 239/284.2 |
| 2122920 | 1/1984 | (GB) | B05B/1/04 |

*Primary Examiner*—David A. Scherbel
*Assistant Examiner*—Daris Hwu
(74) *Attorney, Agent, or Firm*—Nawrocki, Rooney & Sivertson, P.A.

(57) ABSTRACT

The invention relates to a cleaning system of a surface, such as of at least one headlight of an automotive vehicle. A cleaning system of a surface, such as of at least one headlight of an automotive vehicle, comprising a cleaning device per a tank designed to contain the cleaning liquid, a main pipe linking the reservoir to the cleaning device. The cleaning device comprises diffusing means for diffusing a substantially uniform dispersion of the liquid along a substantially parallel line and situated towards the upper edge of the surface, so that the liquid is distributed on said blanket surface extending between substantially the upper edge and substantially the lower edge of the surface.

9 Claims, 5 Drawing Sheets

U.S. PATENT DOCUMENTS

| | | | |
|---|---|---|---|
| 4,318,510 | * | 3/1982 | Koike ................................. 239/284.2 |
| 4,390,128 | * | 6/1983 | Fujikawa et al. ................. 239/284.2 |
| 4,703,785 | * | 11/1987 | Antos et al. ......................... 141/236 |
| 4,752,032 | * | 6/1988 | Costa et al. ....................... 239/284.2 |
| 4,796,672 | * | 1/1989 | Kanao ................................. 138/154 |
| 4,865,059 | * | 9/1989 | Leleve' ............................ 239/284.2 |
| 4,877,186 | * | 10/1989 | Scholl .............................. 239/284.1 |
| 4,988,043 | * | 1/1991 | Lechler ................................ 239/597 |
| 5,163,619 | * | 11/1992 | Wada ................................. 239/284.1 |
| 5,242,114 | * | 9/1993 | Camier et al. ..................... 239/284.2 |
| 5,269,464 | * | 12/1993 | Epple et al. ....................... 239/284.2 |
| 5,423,487 | * | 6/1995 | Kim .................................. 239/284.1 |
| 5,497,058 | * | 3/1996 | Fujigaya ............................ 239/284.2 |
| 5,636,794 | * | 6/1997 | Hess et al. ........................ 239/284.1 |
| 5,857,624 | * | 1/1999 | Lee .................................... 239/284.1 |
| 5,975,431 | * | 11/1999 | Harita et al. ...................... 239/284.1 |

\* cited by examiner

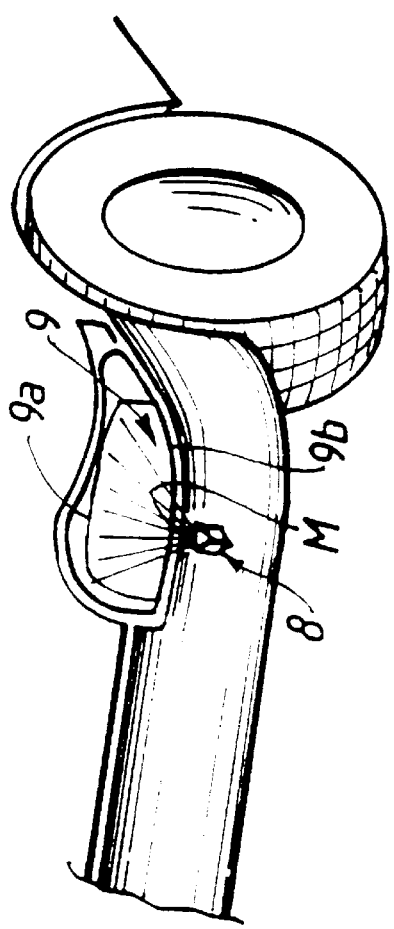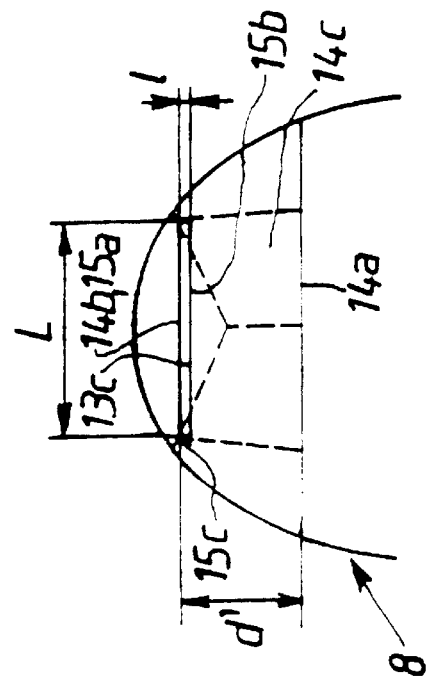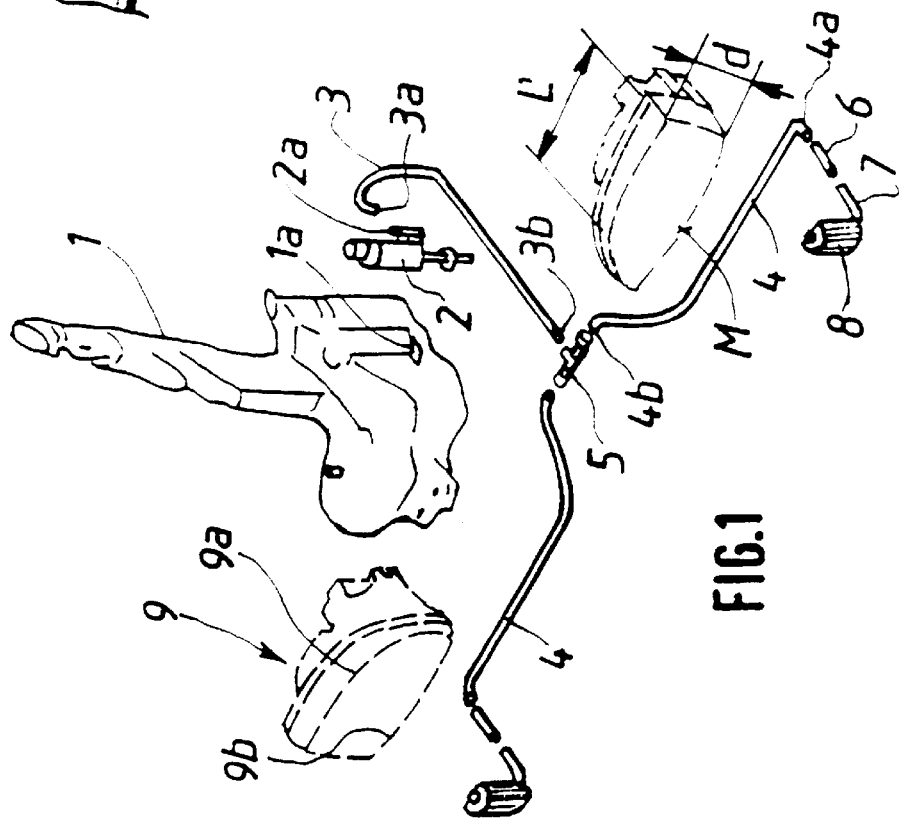

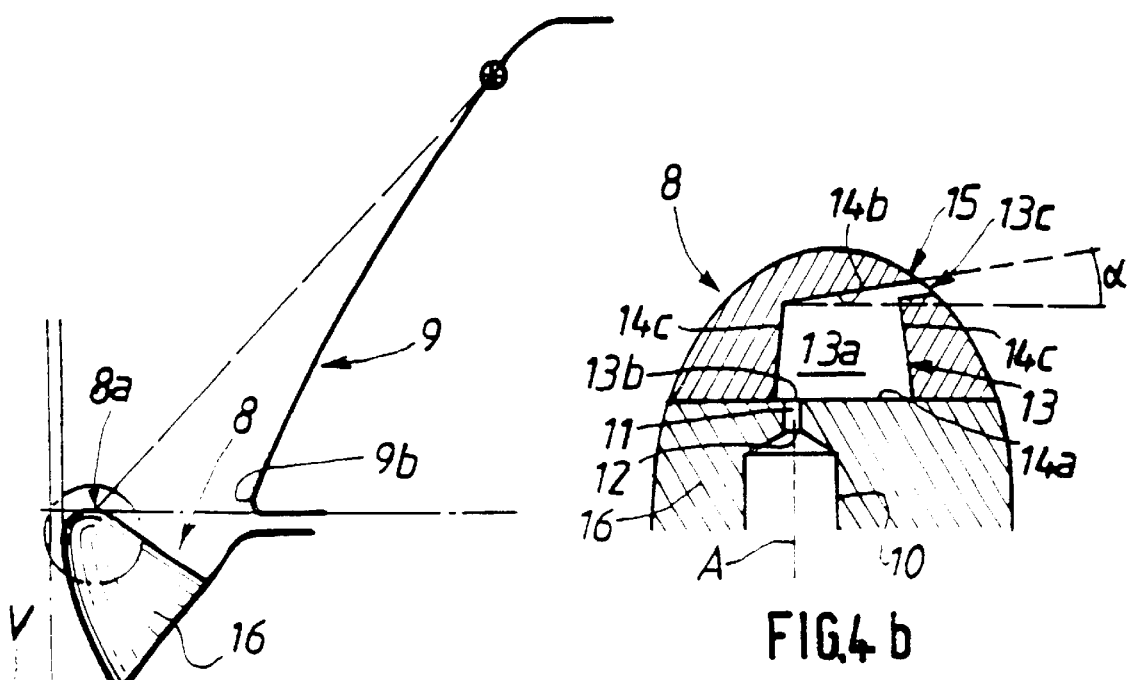
FIG.3
FIG.4b
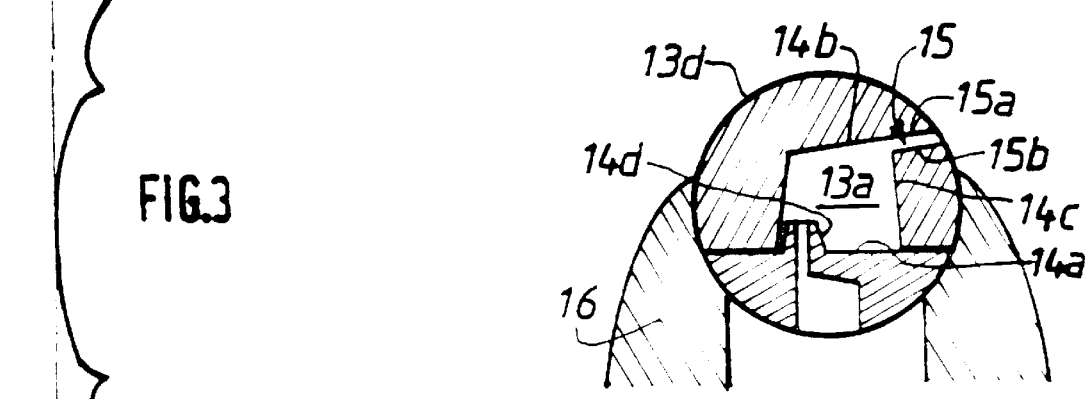
FIG.4c
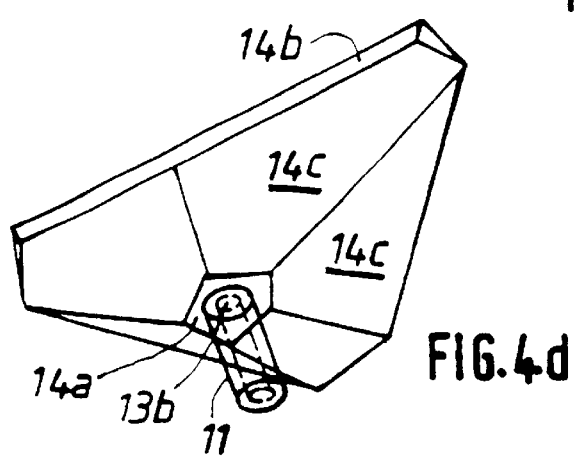
FIG.4d

SYSTEM FOR CLEANING A SURFACE, SUCH AS AT LEAST ONE MOTOR VEHICLE HEADLIGHT

FIELD OF THE INVENTION

The invention relates to a cleaning system of a surface, such as of at least one headlight of an automotive vehicle. The invention relates to a cleaning device of a surface that is part of an assembly, by means of a liquid. The surface to be cleaned is of relatively small dimensions, and is liable to be soiled.

The invention also relates to a cleaning system of a surface of the above-mentioned type, comprising the above-mentioned cleaning device, as well as a reservoir designed to contain the cleaning liquid, and a main pipe linking the reservoir to the cleaning device.

Finally, the invention relates to an assembly adapted to be displaced, notably of the type of at least a part of a vehicle, comprising at least a surface and a cleaning system of the above-mentioned type.

BACKGROUND ART

The embodiment example of the invention to be described is more particularly applied to headlights, forming the surface to be cleaned, or more globally, forming the protection surface of the light device, for example a head device, of a vehicle, automobile among others.

A certain number of vehicles, notably in France the top-of-range vehicles, as well as the Northern Europe vehicles are equipped with a headlights cleaning device because of compulsory standards.

Two types of cleaning systems are presently used. A first type of cleaning system comprises a telescopic cleaning device. More precisely, the distribution and spraying nozzle, when inoperative, is sunk in the volume of the vehicle.

As soon as the system is called upon, a pump sets the circuit under pressure so as to push, in the out position, the telescope which comprises a nozzle at its free extremity and sprays the liquid onto its target.

A second type of cleaning system known in the prior art comprises a cleaning device external to the body of the vehicle, and fixed to the target.

More precisely, as soon as the system is called upon, a pump sets the circuit under pressure in order to push the liquid via a spraying nozzle towards its target.

These two types of cleaning system call upon a pump, which delivers a high pressure with a strong throughput to push the telescope and/or to spray the liquid.

For this reason, it is necessary to use suitably adapted pipes and nozzle.

Moreover, the higher the pressure, the more the ejected liquid "bounces-back" on the targeted surface. Therefore the cleaning loses efficiency and a part of the liquid can be ejected out of the surface.

Although cleaning systems of vehicle windows already exist, they are found to be unusable for such an application.

In fact, the cleaning systems of windows have a lower pressure and use a smaller quantity of liquid, and do not permit to operate the telescope or spray the liquid.

A very particular system must be conceived for the cleaning of the headlights. And this is relatively expensive.

On the other hand, the cleaning by spraying presents a certain number of drawbacks, in addition to the important pressure needed.

As a matter of fact,
the liquid consumption is very high,
the sprayed liquid is not entirely projected on the surface to be cleaned and a non negligible loss of liquid outside of the target occurs;
the use of an agent added to water, such as a cleaning agent or a non-freezing agent, is possible only when a vehicle has stopped. As a matter of fact, the use for example of a mixture of water and a non-freezing agent, such as glycol, triggers, when sprayed, a foaming emulsion that sticks onto the glass of the headlight. Yet the adding of a non-freezing agent is indispensable in Northern countries, were the compulsory standards impose using a cleaning system of the headlights because of the frequent snow and freezing weather. Moreover, it must be possible to carry out the cleaning using a non-freezing agent liquid both when a vehicle has stopped or when it moves, whatever its speed.

Therefore the prior art systems are inefficient.

Not only the cleaning of the headlights is insufficient, but also the light efficiency of the latter is reduced.

Consequently, the invention aims at remedying the drawbacks of the prior art.

SUMMARY OF THE INVENTION

An object of the invention is the mass production of cleaning systems, of the above-mentioned type, notably for headlights of vehicles, and to make a standardization of its components possible.

Another object of the invention is to reduce both the manufacturing and the installation cost of the cleaning system.

Another object of the invention is to reduce both the liquid consumption, as well as the pressure of the liquid to be sprayed, more particularly to reduce the dimensions of the parts forming the cleaning system.

Finally, the invention also aims at a perfect efficiency of cleaning when the vehicle has stopped, and generally of the assembly comprising the surface to be cleaned, and when it moves, whatever its speed.

The invention provides a cleaning device, by means of a liquid, of a surface that is part of an assembly, the said surface being of relatively small dimensions, and likely to be soiled, the said surface being further notably delimited by an upper edge and a lower edge substantially horizontal and facing one another.

This cleaning device comprises a liquid supply duct linked to a supply means of the liquid and at least an outlet duct of the liquid, connected with the supply duct, via a communication hole.

The cleaning device further comprises, communicating with the outlet duct(s) located on the opposite side to the communication hole, means for diffusing a substantially uniform dispersion of the liquid along a substantially parallel line and situated towards the upper edge of the surface, so that the liquid is distributed on said blanket surface extending between substantially the upper edge and substantially the lower edge of the surface.

The supply means of the liquid are so arranged to distribute the liquid at a fairly low pressure.

The diffusion means comprise a hollow piece including a first opening communicating with the outlet duct (s) and a second extended opening, opposite to the first one, and communicating with the outside of the cleaning device.

According to an embodiment, the second opening located with respect to the first opening so that the liquid intended to come out of the outlet duct(s) is deflected.

According to the invention, the hollow piece has the general form of a prism, limited on the one hand, by a first and a second wall, opposed and facing one another, and on the other hand, by a plurality of adjacent lateral walls, all of which connect the first and second walls.

More precisely, the first wall defines at least a part of the first opening whereas the second wall defines at least a part of the second opening.

According to an embodiment, the cleaning device is designed so that the second opening is adjustable with respect to the surface to be cleaned.

The invention also relates to a cleaning system, by means of a liquid, of a surface that is part of an assembly, the said surface being of relatively small dimensions, and likely to be soiled, an upper edge and a lower edge substantially horizontal and facing one another, notably delimiting the surface.

The cleaning system comprises means to supply the liquid and a cleaning device of the above-mentioned type, a reservoir designed to contain the cleaning liquid and a main pipe linking the reservoir to the supply duct of the cleaning device.

According to an embodiment of the invention, the cleaning system may further comprise a pump mounted on the reservoir and linked to the main pipe; and/or a check-valve, disposed at the junction between the main pipe and the supply duct of the is cleaning device.

The liquid is water or water added to a non-freezing agent, such as glycol, and/or a cleaning agent.

According to the invention, the cleaning system is designed so that the pressure of the liquid to be dispersed is low.

The pressure of the liquid is for example approximately 60% lower than the one of the liquid used in the headlights cleaning device of the prior art.

The cleaning device is disposed so that the second opening substantially extends parallel to the upper edge of the surface to be cleaned.

According to an embodiment, the cleaning device is fixed near the lower edge of the surface, the second opening substantially extending parallel and being oriented to the upper edge of the surface to be cleaned.

According to another embodiment, the cleaning device is fixed near the upper edge of the surface, the second opening being close to, opposite and substantially parallel to the said edge.

Finally, the invention relates to an assembly adapted to be displaced, notably of the type of at least a part of a vehicle, comprising:
at least a surface of relatively small dimensions with respect to the assembly, and is likely to be soiled, the said surface notably forming the protection type of the light device, for example a head device, of a vehicle; and
a cleaning system of the surface of the above-mentioned type.

According to a first embodiment, the assembly forms a part at least of an automotive vehicle, the surface to be cleaned being a headlight of an automotive vehicle.

According to a second embodiment, the assembly forms a part at least of an automotive vehicle, and comprises at least two surfaces to be cleaned corresponding respectively to a headlight of an automotive vehicle.

In this embodiment, the assembly comprises a cleaning device for headlight, the cleaning devices being linked to the main pipe via a respective additional pipe, connected on the one hand with the supply duct of the cleaning device and on the other hand with a T adapter, itself linked to the main pipe.

According to the invention, the cleaning device(s) is/are fixed rigidly and protrude from the automotive vehicle body, such as to not project out from the perpendicularity of the automotive vehicle.

According to an embodiment of the invention, the reservoir and the pipes are of the type used for cleaning windows, such as the windshield of an automotive vehicle.

Moreover, the reservoir may be conceived common with the one used for the cleaning of both the windshield and/or the rear window of the automotive vehicle.

When the automotive vehicle does not comprise a cleaning system for the rear window—which is often the case for the three-part vehicles where, as well as the motor, the body is independent of the passenger compartment, using a single reservoir and a single bi-directional pump can be decided for the cleaning system of the headlights and the cleaning system of the windshield.

BRIEF DESCRIPTION OF THE DRAWINGS

The objects of the present invention and its operation will be better understood by reference to the detailed description and the drawings in which like numbers refer to like elements and where:

FIG. 1 is an exploded schematic view of a cleaning system for two headlights of a vehicle according to the invention.

FIG. 2 is a partial schematic view of the front part of an automotive vehicle, with one of its headlights being cleaned.

FIG. 3 is an enlarged schematic side view of the vehicle portion illustrated in FIG. 2, showing an exemplary location of a cleaning device with respect to the headlight.

FIGS. 4a, 4b, and 4c are schematic views of a first embodiment of the cleaning device of the invention. FIG. 4a is a front view of the cleaning device, whereas FIGS. 4b and 4c are axial sections of the two variants of the embodiment.

FIG. 4d is a perspective schematic view of the diffusion means corresponding to a variant of the FIG. 4c.

FIG. 5a, is a front view of the cleaning device, whereas FIGS. 5b and 5c are axial sections of the two variants of the embodiment.

DESCRIPTION OF THE PREFERRED EMBODIMENTS

Figure 5A:
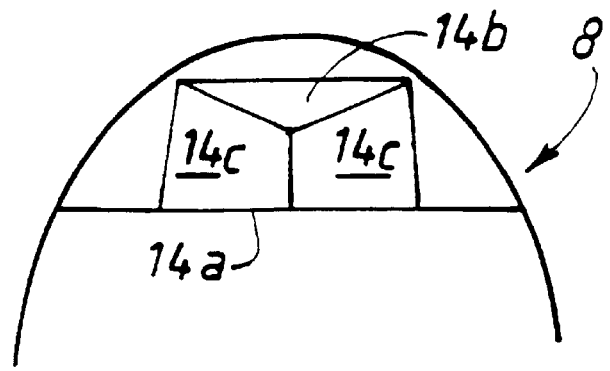
FIGS. 5a, 5b, and 5c are schematic views of a second embodiment of the cleaning device of the invention.

It must be understood that these embodiments can easily be applicable to windows, protecting for example the headlights of a vehicle, and to every surface of relatively small dimensions likely to be moved.

FIG. 1 shows an embodiment of a simultaneous or quasi-simultaneous cleaning system, of the two headlights of a vehicle. This system comprises a reservoir 1, designed to contain the cleaning liquid, a pump 2, designed to be mounted on the reservoir 1 at an opening 1a and to pump the liquid as required.

The pump 2 comprises an outlet aperture 2a, designed to receive an end 3a of a main pipe 3. The other end 3b of the main pipe 3 is connected to two additional pipes 4 by means of a T-shaped adapter 5. The respective free end 4a of each additional pipe 4, opposite to the one 4b adapted to the adapter 5, is connected to a check-valve 6.

The check-valve 6 is itself connected, on the opposite side to the free end 4a, to a portion of pipe 7 itself communicating with a cleaning device 8.

The T-shaped adapter 5 and the check valves 6 are of conventional types and therefore will not be described in detail. The main pipe 3, the additional pipes 4, and a portion of pipe 7 are made of plastic material, e.g. PVC (polyvinyl chloride) or of EPDM (ethylene-propylene-dialkene-monomer) rubber. For example, they have a minimal diameter of approximately 3.5 mm., notably a diameter ranging from approx. 4 to approx. 6 millimeters. By way of example once again, the length of the main pipe 3, measured along its axis, is approximately 2 meters, whereas the length of each additional pipe 4 is approximately 1 meter, and the length of each portion of pipe 7 is approximately 70 millimeters.

For an increased efficiency and a better standardization, the reservoir 1 and the pump 2 can be of the same type as those used to clean windows, such as those used for the windshield of automotive vehicles.

In one embodiment, it may be decided that the reservoir 1 of the system of the invention is common with the reservoir used for cleaning the windshield of a vehicle, for example.

According to one embodiment, the reservoir 1 is located in a cold-insulated area. For example, the reservoir 1 is placed inside a wing of the vehicle, or in the motor compartment, to take advantage of the radiating heat released by the motor when running. The reservoir 1 capacity must comply with the compulsory standards.

Therefore, in one embodiment, the volume of the liquid used in pump 2 must make it possible to carry out approximately 50 cleaning cycles. A cleaning cycle is defined by a determined number of impulsions.

In the case when the reservoir 1 is common with the reservoir used for the cleaning of the windshield, the minimal remaining volume for cleaning the windshield is approximately 1 liter.

As for pump 2, it is, for example of the type that comprises a plunger and a direct current motor, designed to be branched for example on the battery of an accumulator.

The motor comprises a pivoting axial output shaft, at the end of which is mounted a rotor.

The plunger comprises a terminal liquid inlet, communicating with the opening 1a of the reservoir 1, and on the other hand communicating with the outlet aperture 2a.

More precisely, the plunger mainly comprises a duct having the said terminal inlet as well as a side inner edge.

The plunger also comprises a pump priming rod accommodated coaxially in the duct and rigidly linked to the rotor. The latter controls the rotation of the priming rod around the longitudinal axis of the rotor.

The function is to suck-up the cleaning liquid contained in the reservoir 1, via the duct and then to force it down into the main pipe 3, through the outlet 2a.

The system can further comprise means for adjusting the quantity of liquid extracted by the pump 2 at each impulsion. An adjustable timer (not shown) can further be provided on the pump 2.

Various types of pump operating at a low pressure can be used. According to an embodiment, the pump 2 is a standard type of pump with only one outlet.

According to another embodiment, the pump 2 is a two-outlet pump, allowing the outflow of the cleaning liquid through one or the other of the outlets alternatively, or both outlets simultaneously.

Figure 6:
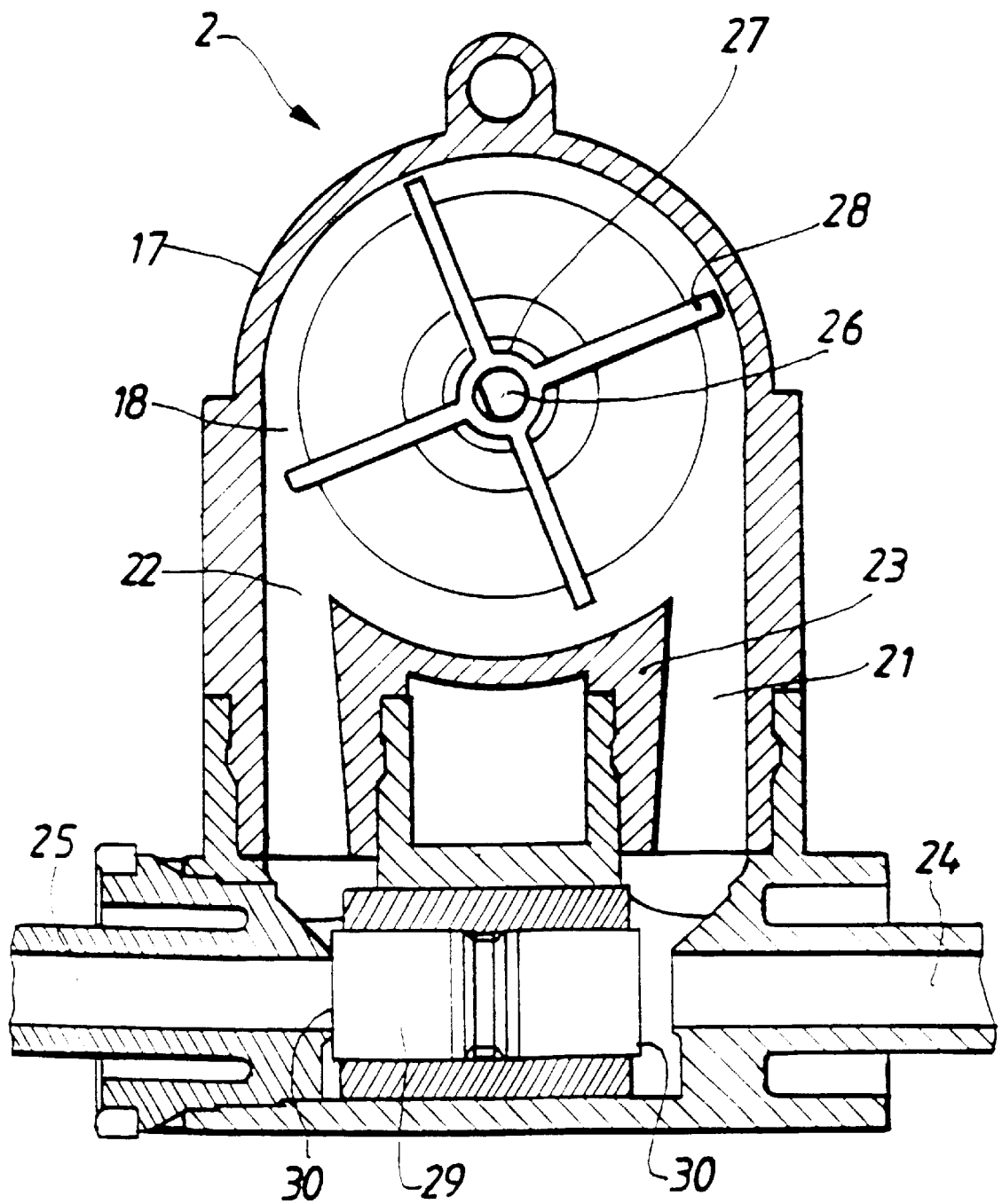
FIG. 6 is a top transversal schematic view, of an embodiment of the pump.

An example of the pump 2 with two outlets, allowing the liquid to be forced down by either one or the other of the two outlets alternatively is illustrated in FIG. 6.

The pump 2 comprises a body 17, constituting a support and a protection, a motor and an electrical connector (not-shown) allowing the connection to a battery of accumulators.

The body 17 defines inside the pump 2 a chamber 18 with an inlet of the cleaning liquid (not-shown).

The chamber 18 is extended at its lower part, by two ducts 21 and 22 substantially parallel to each other and separated by the wall 23.

The two ducts 21 and 22 are extended at their end opposite the chamber 18, by two side outlets 24 and 25, respectively.

The outlets 24 and 25 are disposed so that their longitudinal axis substantially merge, one of the ends of the outlets 24 and 25 being located near the ducts 21 and 22, respectively, the other end of the outlets apertures 24 and 25 opening on to the outside.

The motor has an axial driven shaft 26, that penetrates into the chamber 18. On the extreme part of the shaft 26 located in the chamber 18 is mounted, angularly wedged, a rotor 27 with blades 28. The pivoting of rotor 27 causes the circulation of the liquid on the circumference of the chamber 18, thanks to the blades 28, from the inlet to the outlets 24 and 25 passing through the ducts 21 and 22.

Between the two outlets 24 and 25, is mounted a piston 29, with a longitudinal dimension smaller than the distance between the two ends of the outlets 24 and 25 situated near the ducts 21 and 22. The piston 29 is capable of sliding by translation towards one or the other of the outlets 24 and 25.

The contact of one of the ends 30 of the plunger 29 with the end of one of the outlets 24 or 25 situated near the ducts 21 and 22 causes the sealing of this outlet 24 or 25, the liquid therefore not being able to be evacuated outside the pump 2 otherwise than through the other outlet.

Therefore, with reference to FIG. 6, when the rotor 27 turns clockwise, the liquid arriving through duct 21 forces the plunger 29 against the outlet 25, thus sealing up the aperture 25, and the liquid outflows the pump 2 through the outlet 24.

On the other hand, it must be understood that the number of pipes 3,4 and 7 and their characteristics are only given by way of non-limiting examples.

According to the embodiments, it is in fact possible to adapt the pipes 3,4, and 7 for example in function of the type of pump used. Therefore, when the pump used is a single outlet pump, the liquid outgoing the pump passes through a derivation or a T- or Y-shaped adapter, to supply the two cleaning devices 8.

Consequently according to the embodiment of this adapter, a head loss may occur, which entails a lower volume of the liquid distributed to one of the cleaning devices 8. In such a case, this head loss may be compensated by designing the pipe 4 as linked to the outlet of the adapter 5 having the lowest rate and supplying a cleaning device 8, is of a reduced length with respect to the second pipe 4 linked to the outlet of the same adapter 5 having the highest rate.

A similar arrangement of the pipes 4 may be designed with some two-outlet pumps, possibly having head losses at one of the outlets of the pump. Depending on the type sort of pump used, the absence of a portion of pipe 7 or the using of two main ducts 3, each directly connected to the cleaning device 8 can be decided.

The elements composing the system that has just been described, except for the cleaning device 8, are fitted inside the vehicle. Therefore they are hidden by the body.

Their forms and dimensions are consequently adapted to their locations. Thus the main pipes 3 and the additional pipes 4 can be bent.

As shown in FIGS. 2 and 3, each cleaning device 8 is disposed projecting outside the vehicle with respect compared to its body. The surface to be cleaned 9, for example a headlight of a vehicle is generally defined by an upper edge 9a and a lower edge 9b. These edges 9a and 9b are substantially horizontal and facing one another, the lower edge 9b being closer to the wheels of the vehicle.

The headlights of the vehicles are generally substantially rectangular or ellipsoid. The cleaning device 8 of the invention is rigidly and sealingly fixed either on the shield, or on the cowl of the vehicle or directly on one of the upper or lower edges 9a, 9b of the headlight.

According to an embodiment of the invention, the dimensions and the disposition of the cleaning device 8 is such that it does not project from the perpendicularity of the automotive vehicle.

As shown in FIG. 3, the free end 8a of the cleaning device 8 does not project from the vertical line V defined by the most frontal part of the vehicle located farthest in front.

With reference to FIGS. 4a to 4d, presently the first embodiment of the cleaning device 8 of the invention will now be described. It comprises a supply duct 10 of the liquid, designed to be connected to the free end of the portion of pipe 7, or in another embodiment, directly connected to the check valve 6.

On the opposite side to the pipe 7 portion, or if necessary, to the check valve 6, the supply duct 10 is communicating with the outlet duct 11 of the liquid, via a communicating hole 12.

In the present embodiment, the supply duct 10 and the outlet duct 11 substantially extend in the same direction.

Their extension out in an inclined way one with respect to the other, can also be provided.

On the other hand, the supply duct 10 has a transversal section of a diameter greater than the one of the outlet duct 11.

In the shown embodiments, the supply duct 10 and the outlet duct 11 have a constant circular transversal section all along their axes, respectively.

As will be discussed subsequently, the dimension of the transversal section of the outlet duct 11 makes it possible to adjust the spray of the liquid to be distributed.

In the present embodiment, only one outlet duct 11 is provided. However, a plurality of outlet ducts 11 may be provided either in communication via several communication holes 12, with the supply duct 10. These outlet ducts 11 can extend in the same direction or in different directions, substantially inclined with respect to the supply duct 10.

On the opposite side to the communication hole 12, the outlet duct 11 is communicating with the diffusion means 13.

The diffusion means 13 are in the form of a bellow piece or capsule 13a, forming the liquid distribution nozzle.

The capsule 13a comprises a first opening 13b communicating with the outlet duct 11 and a second narrow extended opening 13c opposite the first opening 13b, and communicating with the outside of the cleaning device 8.

According to the shown embodiment, the capsule 13a generally has a form of a prism, for example a parallelepiped.

A first wall 14a comprises a first opening 13b. It spreads out along a substantially perpendicular plane to the A axis of the outlet duct 11.

The second wall 14b, opposite and facing the first wall 14a, is extended by a nozzle 15 opening on to the outside of the cleaning device 8 through the second opening 13c.

The first and second walls 14a and 14b are connected by a plurality of walls 14c, so as to form together a prismatic space, see FIG. 4d. Each wall 14c extends respectively in an inclined plane, preferably different from 90°, with respect to the walls 14a and 14b.

As shown in FIGS. 4b and 4c, the nozzle 15 is formed by two sides 15a and 15b separated and opposite each other. The face 15a extends the wall 14b, whereas the face 15b is adjacent and substantially perpendicular to the corresponding wall 14c.

Owing to its position with respect to the first opening 13b, the second wall 14b function is to deflect the liquid spray coming from the outlet duct 11, for driving it into the nozzle 15 and eject it along a uniform line, via the second opening 13c, to form a blanket.

In the shown embodiments, the deflective wall 14b is inclined with respect to the first wall 14a by an angle $\alpha$ of about 15° to 25°, notably 21°.

The form of the deflective wall 14b determines the form of the liquid blanket designed to be projected onto the headlight 9. Therefore, it may be changed, depending on the desired form of the blanket. Moreover, faces 15a and 15b of the nozzle converge towards the second opening 13c. So as to control the distribution of the blanket, the faces 15a and 15b are linked together at their respective ends respectively by a lateral face 15c. Thus, the nozzle 15 has a substantially rectangular transversal section, the two lateral faces 15c being in front of each other.

The second opening 13c also has a substantially rectangular shape. The dimension of the first opening 13b is substantially equal to or bigger than the dimension of the transversal section of the outlet duct 11, at its junction with the diffusion means 13.

Moreover, in the embodiment shown in FIG. 4d, the first wall 14a has a perimeter slightly larger than the transversal section of the outlet duct 11, so that the shape of the first wall 14a is close to that of the opening 13b. On the other hand, in the illustrated example, for an outlet duct 11 section having a diameter of 1.5 millimeters, the minimum distance d' separating the wall 14a from the wall 14b is approximately 5.8 millimeters, thus approximately four times greater.

The orientations of the deflective wall 14b and the face 15b, as well as the distance d' notably depend on the desired form of the blanket, this one being either symmetric or asymmetric, i.e. with a particular spot that should receive more liquid than the others.

In a variant of an embodiment shown in FIG. 4c, the capsule 13a is inscribed in a sphere 13d and the first wall 14a comprises a notch 14d oriented towards the inside of the capsule 13a. This notch 14d comprises the first opening 13b.

The outlet duct 11 is further adapted to be introduced inside this notch 14d, so as to form a pivot for the sphere 13d and thus for the capsule 13a.

The latter one, and more precisely the second opening 13c, can therefore be oriented with respect to the surface to be cleaned. Of course, other orientation means of the second opening 13c, can be provided. For example, the orientation of the diffusion means at the supply duct 10 can be provided.

The FIG. 4a clearly illustrates the extended and thin form of the second opening 13c. In an embodiment, the largest dimension L of the second opening is approximately 22 times smaller then the length L' of the upper edge 9a of the headlight 9. In addition, the smallest dimension 1 of the second opening 13c, i.e. the distance separating the sides 15a and 15b at the opening 13c—is approximately 100 times smaller than the distance d' separating the upper edge 9a from the lower edge 9b of the headlight 9.

Figure 5B:
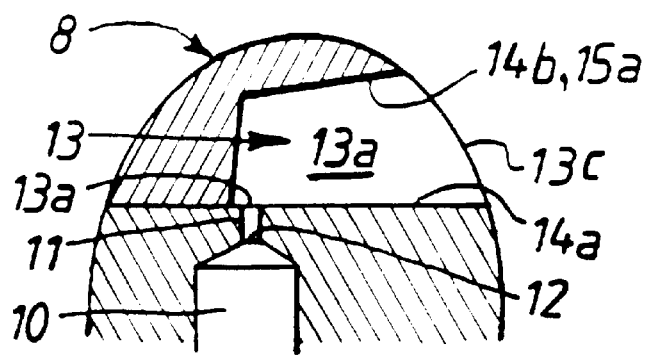
Figure 5C:
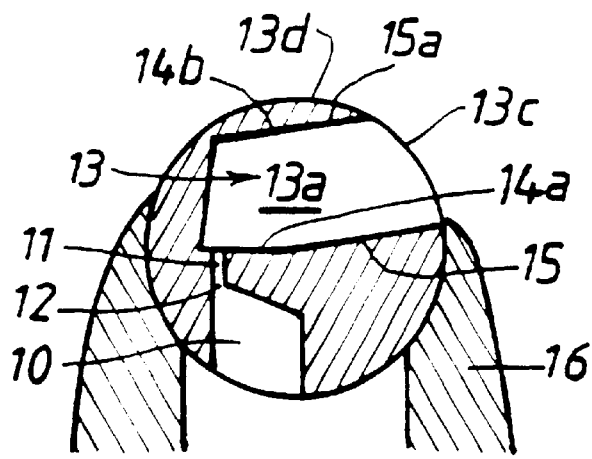

In an embodiment shown in FIGS. 5a to 5c, the cleaning device 8 also comprises a supply duct 10 and an outlet duct 11, substantially similar to those of the FIGS. 4a to 4c. Moreover, the diffusion means 13 also have the form of a capsule 13a whose generally is similar to those of FIGS. 4a to 4c.

The second opening 13c also has the form of a substantially rectangular contour. In addition, its small dimension 1 is greater than those of FIGS. 4a to 4c. More precisely, one of the walls 14c is suppressed and the face 15b of the nozzle is an extension of the first wall 14a, for example in an inclined manner with respect to the latter see FIG. 5c.

The outlet duct 11, as well as the diffusion means 13 are surrounded by a jacket 16, for example made of plastic, whose form depends on the technical and ergonomic requirements.

Figure 7:
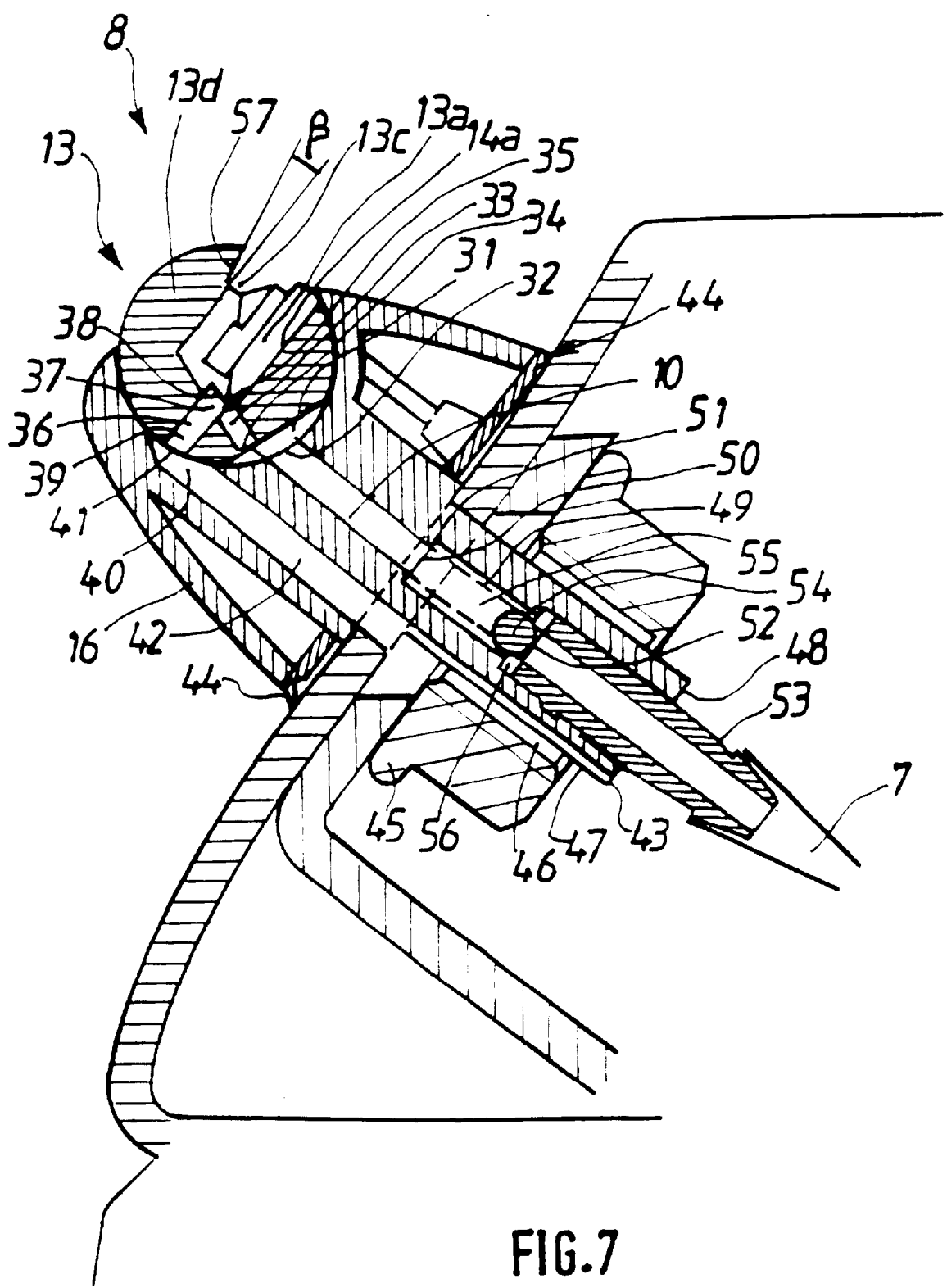
FIG. 7 is a longitudinal schematic view of an embodiment of the cleaning device mounted on the shield of the vehicle.

FIG. 7 shows another embodiment of the cleaning device 8 of the invention. It comprises a supply duct 10 of the liquid, designed to be connected to the free end of the portion of pipe 7.

Opposite the portion of pipe 7, the supply duct 10 is communicating with the chamber 31 accommodated in the lower part of the diffusion means 13, notably of the sphere 13d, via a communication hole 32.

The chamber 31 makes it possible to direct the sphere 13d, with respect to the surface to be cleaned, while ensuring the passage of the liquid from the supply duct 10 into the sphere 13d.

The chamber 31, opposite the supply duct 10, is extended by the duct 33, in communication, via a communication hole, 34 with the chamber 31, and with the capsule 13a via a communication hole 35.

The capsule 13a general form is substantially similar to the one shown in FIGS. 4a to 4c.

According to the embodiment shown in FIG. 7, the diffusion means 13 comprise the sphere 13d including an outlet duct 36 opposite the second opening 13c. This outlet duct 36 is disposed at first wall 14a and near the duct 33. One of the ends 37 of the outlet duct 36 is communicating with the capsule 13a via the connection hole 38, and the other end 39 of the outlet duct 36 is communicating with a chamber 40 arranged in the jacket 16, via a communication hole 41.

The chamber 40 is extended by an evacuation duct 42, for example substantially parallel to the supply duct 10. The evacuation duct 42 is extended all along the jacket 16 and opens, through a valve 43 orientated towards the outer side of the vehicle, for example at the inner face of the shield.

Rain water and/or the cleaning liquid thus do not stay, inside the cleaning device 8 but is/are evacuated to the outside. The waterproofness of the cleaning device 8 is ensured for example by one or several joints 44 placed between the shield or the cowl of the vehicle receiving the cleaning device 8 and the region of the jacket 16 opposite the sphere 13d.

The fixing of the cleaning device 8 on the shield or on the cowl of the vehicle may be ensured by a nut 45, thanks to a thread 46 arranged in the external wall 47 of the jacket 16. Preferably, the nut 45 and the corresponding thread of the jacket 16, are placed on the non-visible part of the jacket 16. The end 48 of the jacket 16 opposite the sphere 13d is provided with a check valve comprising a duct 49 communicating with by one of its ends 50 with the end 51 of the supply duct 10 opposite the sphere 13d.

The duct 49 is, by its other end 52, communicating with the hose nozzle 53, whose transversal section is smaller than the one of the duct 49, and on which is fixed the pipe 7. Inside the duct 49, a mobile ball 54 is held in place against the end 52 of the duct 49 located beside the hose nozzle 53, thanks to a spring 55 accommodated in the duct 49.

An O-ring 56 disposed at the end 52 of the duct 49 in communication with the nozzle hose 53, ensures the waterproofness of the system. Therefore, when the cleaning liquid arrives through pipe 7 and passes in the hose nozzle 53, the pressure exercised by the liquid pushes the mobile ball 54 up by compressing the spring 55. The cleaning liquid may then pass into the duct 49 then into the supply duct 10 and the capsule 13a.

When the cleaning device 8 is no longer supplied with cleaning liquid, the spring 55 returns to its initial state by pushing the mobile ball 54 against the O-ring 56, therefore stopping the cleaning liquid from passing again in the hose nozzle 53.

Obviously the check valve and/or the evacuation system of rain water and/or of the cleaning liquid that are more specially described in the embodiment of FIG. 7, can also be installed on embodiments of the FIGS. 4 and 5.

According to a particular embodiment, the wall 14b of the sphere 13d comprises on the side of the opening 13c, a terminal region 57 slightly recessed from the plan passing by wall 14b.

More particularly, the plan merging with the surface formed by the terminal region 57 makes an angle β of a few degrees with the plan merging with the surface formed by the wall 14b. Consequently, the adjustment of the diffusion means with respect to the surface to be cleaned may be carried out, without risking to damage the terminal part 57 of the wall 14b, and thus to damage the blanket of the distributed liquid by introducing a adjusting tool into the opening 13c, along a direction substantially parallel to the wall 14b, and by modifying the position of the sphere 13d in the jacket 16.

The particular form of the diffusion means 13 of the embodiments previously described allows them to diffuse a substantially uniform blanket of the liquid, projected on the surface 9 along a substantially parallel line and situated towards the upper edge 9a of the surface to be cleaned—in the present case of the headlight 9, see FIG. 2.

Therefore, the liquid is distributed on the surface 9, as a blanket, extending from substantially the upper edge 9a and substantially the lower edge 9b of the surface. The blanket of liquid is then naturally laid on the surface 9, notably under the dynamic effect of air. Moreover, when the vehicle moves, the liquid attacks the bottom of the headlight 9 and moves up, detaching the dirt when passing.

This effect makes it possible to improve the cleaning of the surface 9 with respect to a simple spraying of a liquid, the vehicle being stopped or moving. On the other hand, the blanket projection of the liquid offers other considerable advantages. As a matter of fact, whether using pure water or water mixed with a non-freezing agent, such as glycol, or a cleaning agent, the result is the same.

As said before, the form and the dimension of the capsule 13a and the outlet duct 11 depend on the desired form and dimension of the blanket, and notably of the headlight 9 to be cleaned.

In the illustrated embodiments, the cleaning device 8 is fixed near the lower edge 9b of the headlight 9, preferably located in the close proximity of the middle M of the segment forming said edge 9b, see FIG. 2.

The second opening 13c, more precisely its longitudinal edges substantially parallel to the dimension L, formed by the faces 15a and 15b, extends substantially parallel to the upper edge 9a and is oriented towards the upper edge 9a.

In another embodiment, disposing the cleaning device 8 near the upper edge 9a of the headlight 9, with its second opening 13c nearby, facing and substantially parallel to the upper edge 9a, can be provided. In such a embodiment (not shown), the liquid is thus projected directly onto the headlight 9, from its upper edge 9a to flow down towards the lower edge 9b, as is the case in the previous embodiments. Under these conditions, the largest dimension L of its second opening 13c can be provided substantially equal to the length L' of the upper edge 9a.

According to another embodiment, the cleaning liquid can be distributed for each headlight 9, in the form of two liquid blankets. This embodiment variant is in particular possible in the case of "discharge" type headlights. In the case of this type of headlights, the surfaces passed through by light beams are reduced with respect to the conventional headlights and generally with a round form in number of two, one corresponding to the lamp used for the traffic beam and the other for the lamp used for the headlamp main beam. With this type of optics, it is not necessary to sweep the totality of the headlight surface 9, but only the surfaces passed through by the light beams.

For this purpose, the wall 14b of the capsule 13a is provided with a protrusion, oriented to the outside of the wall 14, and thus towards the wall 14a, not shown in the Figures. This protrusion is disposed on the main part and substantially at the center of the wall 14b, its transversal section increasing from the side of the wall 14b opposite the second opening 13c towards the side of the wall 14a located near the second opening 13c. Thus, the cleaning liquid is, as it progresses in the capsule 13a, split into two distinct blankets that will be diffused on a "discharge" type headlight.

According to an embodiment, the height of the protrusion, with respect to the plan passing by the wall 14b, is approximately 1 mm.

It must be further understood that the form of the jacket 16, as well as notably the inclination of the deflective wall 14b, will be adapted in such a case. Of course, the invention is not limited to the embodiments described above and other variants can be considered without departing from the scope of the invention.

The invention may also be applied to the cleaning of a single headlight of an automotive vehicle. Such a cleaning system will be similar to the one illustrated in the FIG. 1. It comprises only one pipe, for example the main pipe 3 linking the cleaning device 8 or the check valve 6 to the pump 2.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A cleaning system, by means of a liquid, of a surface that is part of an assembly, the said surface being of relatively small dimensions, and likely to be soiled, the said surface being further notably delimited by an upper edge and a lower edge substantially horizontal and facing one another, the cleaning system comprising the supply means of the liquid and a cleaning device comprising:

a supply duct of a liquid, linked to a supply means;

an outlet duct of the liquid, communicating with the supply duct, via a communication hole; and diffusion means in communication with said outlet duct on the opposite side to the communication hole; characterized in that the diffusing means are designed so as to disperse the liquid substantially uniformly along a substantially parallel line and situated towards the upper edge of the surface, such as to define a blanket surface, the liquid being distributed on said blanket surface extending between substantially the upper edge and substantially the lower edge of the surface; and in that the supply means are designed to distribute the liquid at a substantially low pressure characterized in that the diffusing means comprise a hollow piece comprising a first opening communicating with the outlet duct(s) and a second extending opening on a wall opposite and essentially perpendicular to the first opening and communicating with the outside of the cleaning device, and in that the hollow piece has a general form of prism, limited on the one hand, by a first and a second wall, opposite and facing one another, and on the other hand, by a plurality of adjacent side walls, all of which connect the first and second walls, and further characterized in that the first wall (14a) comprises the first opening (13b) whereas the second wall (14b) limits at least a part of the second opening (13c).

2. A cleaning system, by means of a liquid, of a surface that is part of an assembly, the said surface being of relatively small dimensions, and likely to be soiled, the said surface being further notably delimited by an upper edge and a lower edge substantially horizontal and facing one another, the cleaning system comprising the supply means of the liquid and a cleaning device comprising:

a supply duct of a liquid, linked to a supply means;

an outlet duct of the liquid, communicating with the supply duct, via a communication hole; and- diffusion means in communication with said outlet duct on the opposite side to the communication hole; characterized in that the diffusing means are designed so as to disperse the liquid substantially uniformly along a substantially parallel line and situated towards the upper edge of the surface, such as to define a blanket surface, the liquid being distributed on said blanket surface extending between substantially the upper edge and substantially the lower edge of the surface; and in that the supply means are designed to distribute the liquid at a substantially low pressure characterized in that the diffusing means comprise a hollow piece comprising a first opening communicating with the outlet duct(s) and a second extending opening on a wall opposite and essentially perpendicular to the first opening and communicating with the outside of the cleaning device, and in that the hollow piece has a general form of prism, limited on the one hand, by a first and a second wall, opposite and facing one another, and on the other hand, by a plurality of adjacent side walls, all of which connect the first and second walls, and further characterized in that the first wall (14a) substantially extends along a perpendicular plane to the axis of the outlet duct (11).

3. A cleaning system by means of a liquid, of a surface that is part of an assembly, the said surface being of relatively small dimensions, and likely to be soiled, the said surface being further notably delimited by an upper edge and a lower edge substantially horizontal and facing one another, the cleaning system comprising the supply means of the liquid and a cleaning device comprising:

a supply duct of a liquid, linked to a supply means;

an outlet duct of the liquid, communicating with the supply duct, via a communication hole; and- diffusion means in communication with said outlet duct on the opposite side to the communication hole; characterized in that the diffusing means are designed so as to disperse the liquid substantially uniformly along a substantially parallel line and situated towards the upper edge of the surface, such as to define a blanket surface, the liquid being distributed on said blanket surface extending between substantially the upper edge and substantially the lower edge of the surface; and in that the supply means are designed to distribute the liquid at a substantially low pressure; and characterized in that the diffusing means comprise a hollow piece comprising a first opening communicating with the outlet duct(s) and a second extending opening on a wall opposite and essentially perpendicular to the first opening and communicating with the outside of the cleaning device, and characterized in that the hollow piece has a general form of prism, limited on the one hand, by a first and a second wall, opposite and facing one another, and on the other hand, by a plurality of adjacent side walls, all of which connect the first and second walls, and further characterized in that the second wall (14b) is inclined by an angle ($\alpha$) of about 15° to 25°, with respect to the first wall (14a).

4. A cleaning system by means of a liquid, of a surface that is part of an assembly, the said surface being of relatively small dimensions, and likely to be soiled, the said surface being further notably delimited by an upper edge and a lower edge substantially horizontal and facing one another, the cleaning system comprising the supply means of the liquid and a cleaning device comprising:

a supply duct of a liquid, linked to a supply means;

an outlet duct of the liquid, communicating with the supply duct, via a communication hole; and- diffusion means in communication with said outlet duct on the opposite side to the communication hole; characterized in that the diffusing means are designed so as to disperse the liquid substantially uniformly along a substantially parallel line and situated towards the upper edge of the surface, such as to define a blanket surface, the liquid being distributed on said blanket surface extending between substantially the upper edge and substantially the lower edge of the surface; and in that the supply means are designed to distribute the liquid at a substantially low pressure; and characterized in that the diffusing means comprise a hollow piece comprising a first opening communicating with the outlet duct(s) and a second extending opening on a wall opposite and essentially perpendicular to the first opening and communicating with the outside of the cleaning device; and characterized in that the hollow piece has a general form of prism, limited on the one hand, by a first and a second wall, opposite and facing one another, and on the other hand, by a plurality of adjacent side walls, all of which connect the first and second walls, and further characterized in that the second wall (14b) is extended by a nozzle (15) opening on to the outside of the cleaning device (8), through the second opening (13c).

5. A cleaning system by means of a liquid, of a surface that is part of an assembly, the said surface being of relatively small dimensions, and likely to be soiled, the said surface being further notably delimited by an upper edge and a lower edge substantially horizontal and facing one another, the cleaning system comprising the supply means of the liquid and a cleaning device comprising:

a supply duct of a liquid, linked to a supply means;

an outlet duct of the liquid communicating with the supply duct via a communication hole; and diffusion means in communication with said outlet duct on the opposite side to the communication hole; characterized in that the diffusing means are designed so as to disperse the liquid substantially uniformly along a substantially parallel line and situated towards the upper edge of the surface, the liquid being distributed on said blanket surface extending between substantially the upper edge and substantially the lower edge of the surface; and in that the supply means are designed to distribute the liquid at a substantially low pressure; further characterized in that the diffusing means comprise a hollow piece comprising a first opening communicating with the outlet duct(s) and a second extending opening on a wall opposite and essentially perpendicular to the first opening and communicating with the outside of the cleaning device; and further characterised in that the largest dimension (L) of the second opening (13c) is approximately 22 times smaller than the length (L') of the upper edge (9a) of the surface (9).

6. A cleaning system by means of a liquid, of a surface that is part of an assembly, the said surface being of relatively small dimensions, and likely to be soiled, the said surface being further notably delimited by an upper edge and a lower edge substantially horizontal and facing one another, the cleaning system comprising the supply means of the liquid and a cleaning device comprising:

a supply duct of a liquid, linked to a supply means;

an outlet duct of the liquid, communicating with the supply duct via a communication hole; and diffusion means in communication with said outlet duct on the opposite side to the communication hole; characterized in that the diffusing means are designed so as to disperse the liquid substantially uniformly along a substantially parallel line and situated towards the upper edge of the surface, the liquid being distributed on said blanket surface extending between substantially the upper edge and substantially the lower edge of the surface; and in that the supply means are designed to distribute the liquid at a substantially low pressure; further characterized in that the diffusing means comprise a hollow piece comprising a first opening communicating with the outlet duct(s) and a second extending opening on a wall opposite and essentially perpendicular to the first opening and communicating with the outside of the cleaning device; and further characterised in that the smallest dimension of the second opening (13c) is approximately 100 times smaller than the distance (d) separating the upper edge (9a) from the lower edge (9b) of the surface (9).

7. A cleaning system by means of a liquid, of a surface that is part of an assembly, the said surface being of relatively small dimensions, and likely to be soiled, the said surface being further notably delimited by an upper edge and a lower edge substantially horizontal and facing one another, the cleaning system comprising the supply means of the liquid and a cleaning device comprising:

a supply duct of a liquid, linked to a supply means;

an outlet duct of the liquid, communicating with the supply duct via a communication hole; and diffusion means in communication with said outlet duct on the opposite side to the communication hole; characterized in that the diffusing means are designed so as to disperse the liquid substantially uniformly along a substantially parallel line and situated towards the upper edge of the surface, the liquid being distributed on said blanket surface extending between substantially the upper edge and substantially the lower edge of the surface; and in that the supply means are designed to distribute the liquid at a substantially low pressure; further characterised in that the diffusing means (13) comprises a sphere (13d) including, opposite the second opening (13c), an outlet duct (36) communicating through one of its ends (37) with the capsule (13a) and through its other end (39) with the chamber (40), extended by an evacuation duct (42) opening out the aperture (43) onto the outside of the vehicle.

8. A cleaning system by means of a liquid, of a surface that is part of an assembly, the said surface being of relatively small dimensions, and likely to be soiled, the said surface being further notably delimited by an upper edge and a lower edge substantially horizontal and facing one another, the cleaning system comprising the supply means of the liquid and a cleaning device comprising:

a supply duct of a liquid, linked to a supply means;

an outlet duct of the liquid, communicating with the supply duct via a communication hole; and diffusion means in communication with said outlet duct on the opposite side to the communication hole; characterized in that the diffusing means are designed so as to disperse the liquid substantially uniformly along a substantially parallel line and situated towards the upper edge of the surface, the liquid being distributed on said blanket surface extending between substantially the upper edge and substantially the lower edge of the surface; and in that the supply means are designed to distribute the liquid at a substantially low pressure; and further characterised in that the diffusion means (13) comprise a protrusion oriented to the outside of the wall (14b), towards the wall (14a) disposed on the main part substantially at the center of the wall (14b), the protrusion transversal section increasing from the side of the wall 14b opposite the second opening (13c) towards the side of the wall (14b) located near the second opening (13c).

9. A cleaning system, by means of a liquid, of a surface that is part of an assembly, the said surface being of relatively small dimensions, and likely to be soiled, the said surface being further notably delimited by an upper edge and a lower edge substantially horizontal and facing one another, the cleaning system comprising the supply means of the liquid and a cleaning device comprising:

a supply duct of a liquid, linked to a supply means;

an outlet duct of the liquid, communicating with the supply duct, via a communication hole; and diffusion means in communication with said outlet duct on the opposite side to the communication hole; characterized in that the diffusing means are designed so as to disperse the liquid substantially uniformly along a substantially parallel line and situated towards the upper edge of the surface, such as to define a blanket surface, the liquid being distributed on said blanket surface extending between substantially the upper edge and substantially the lower edge of the surface; and in that the supply means are designed to distribute the liquid at a substantially low pressure; and characterized in that the diffusing means comprise a hollow piece comprising a first opening communicating with the outlet duct(s) and a second extending opening on a wall opposite and essentially perpendicular to the first opening and communicating with the outside of the cleaning device, and characterized in that the hollow piece has a general form of prism, limited on the one hand, by a first and a second wall, opposite and facing one another, and on the other hand, by a plurality of adjacent side walls, all of which connect the first and second walls, and further characterised in that the wall (14b) comprises on the side of the opening (13c), a terminal region (57), the plan merging with the surface formed by terminal region (57) making with the plan merging with the surface formed by the wall (14b) an angle of a few degrees.

* * * * *